United States Patent
Larkin

[11] 3,760,012
[45] Sept. 18, 1973

[54] PREPARATION OF 1,3-DINITROALKANES
[75] Inventor: John M. Larkin, Wappingers Falls, N.Y.
[73] Assignee: Texaco, Inc., New York, N.Y.
[22] Filed: Dec. 10, 1971
[21] Appl. No.: 206,870

Related U.S. Application Data
[63] Continuation-in-part of Ser. No. 782,411, Dec. 9, 1968, abandoned.

[52] U.S. Cl. .......... 260/644, 260/593 R, 260/601 R
[58] Field of Search .................... 260/593 R, 601 R, 260/644

[56] References Cited
UNITED STATES PATENTS
2,997,504  8/1961  Shechter et al ................ 260/644 X
3,631,181  12/1971  Larkin ........................... 260/644 X Primary Examiner—Leland A. Sebastian
Attorney—Thomas H. Whaley et al.

[57] ABSTRACT

A method of preparing 1,3-dinitroalkanes corresponding to the formula:

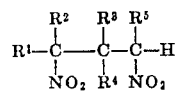

by contacting a dinitroalcohol having at least five carbon atoms corresponding to the formula:

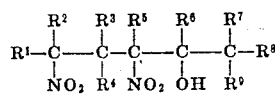

with a basic catalyst at a temperature of from 0° to 150°C. Valuable co-products recoverable from the reaction are ketones or aldehydes. The contemplated 1,3-dinitroalkanes are useful as fuel and lubricant additives and may be converted by hydrogenation to corresponding diamines.

10 Claims, No Drawings

PREPARATION OF 1,3-DINITROALKANES

CROSS-REFERENCE TO RELATED APPLICATION

This application is a continuation-in-part of my co-pending application Ser. No. 782,411, filed Dec. 9, 1968, now abandoned.

BACKGROUND OF THE INVENTION

This invention relates to a method for preparing 1,3-dinitroalkanes. In particular, it relates to a novel method for preparing 1,3-dinitroalkanes from 3,5-dinitro-2-alkanols. Moreover, the method additionally provides as a valuable co-product a carbonyl compound.

Heretofore, 1,3-dinitroalkanes were not generally available at low cost. Where such dinitroalkanes were desired, their manufacture from relatively expensive initial reactants was required. One prior means for producing the dinitroalkanes was by the reaction of a dinitrile with an alkyl nitrate followed by prolonged heating in a base and thereafter acid treating the reaction product. Alternatively, beta-nitroacetate and a nitroalkane were reacted to form the 1,3-dinitroalkane. Such previously known procedures however produced the sought after compounds in relatively poor yields. Moreover, the dinitroalkanes were in many instances recovered in admixture with other products, particularly nitroolefin polymers presenting isolation and purification difficulties. Further, from U.S. Pat. No. 2,997,504 it is taught that gem dinitroalcohols may be converted to primary gem-dinitro compounds by reacting in an alkaline medium. By this method the dinitro compound is first isolated as its salt which upon subsequent acidification leads to the production and recovery of the gem-dinitro compound. Such a method requiring a plurality of steps results in economic penalties leading to a diminution in the commercial attractiveness of the process.

It is therefore an object of this invention to provide a direct method for the preparation of 1,3-dinitroalkanes.

It is another object of this invention to provide a method for the preparation of 1,3-dinitro substituted alkanes which concomitantly provides as valuable and recoverable coproducts carbonyl compounds exemplified by ketones and aldehydes.

Yet another object of this invention is to provide a catalytic method for the preparation of 1,3-dinitro substituted alkanes in high yields.

Other objects and advantages will become apparent from a reading of the following detailed description and examples.

SUMMARY OF THE INVENTION

Broadly, this invention contemplates a method for preparing 1,3-dinitroalkanes which comprises contacting a dinitro-alcohol having at least 5 carbon atoms and corresponding to the formula:

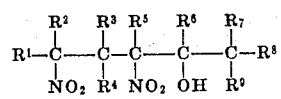

where $R^1$ is hydrogen or an alkyl group having from 1 to 50, preferably from 1 to 10, carbon atoms and where $R^{2-9}$ are hydrogen or alkyl groups having from 1 to 10, preferably from 1 to 5, carbon atoms with a basic catalyst. By employing a dinitro-alcohol having at least 5 carbon atoms, the method additionally provides as valuable co-products carbonyl compounds, including ketones and aldehydes having from 2 to 42, preferably 3 to 20, carbon atoms. In highly preferred embodiments $R^6$ is an alkyl group having from one to six carbon atoms.

The contemplated 1,3-dinitroalkanes prepared according to the instant method correspond to the formula:

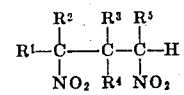

where $R^{1-5}$ are as defined above. In the preferred embodiment where $R^6$ is an alkyl group there is prepared as a valuable and recoverable co-product a ketone corresponding to the formula:

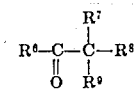

where $R^{6-9}$ are as defined above. In those instances where $R^6$ is hydrogen, the co-product comprises an aldehyde having two or more carbon atoms.

According to this invention the contemplated 1,3-dinitroalkanes are derived from dinitroalcohols corresponding to the above formula and include such alcohols as 3,5-dinitro-2-methyl-2-pentanol, 3,5-dinitro-2,4,4-trimethyl-2-pentanol, 3,5-dinitro-2-methyl-2-heptanol, 4,6-dinitro-3-methyl-3-octanol, 4,6-dinitro-3-(2-propyl)-3-dodecanol, 2,4-dinitro-5-(1-butyl)-5-nonanol, 1,3-dinitro-2,2,4,6,6-pentamethyl-4-heptanol and 4,6-dinitro-3-hexanol.

The illustrative dinitroalcohols contemplated as starting materials and listed above may be prepared, for example, by contacting substituted and unsubstituted non-terminal olefins, that is olefins other than 1-olefins where said olefins have at least 5 carbon atoms such as 2-methyl-2-pentene, 2,4,4-trimethyl-2-pentene, 3-hexene, 2-methyl-2-heptene, 2,2,4,6,6-pentamethyl-3-heptene, 3-methyl-3-octene, 5-butyl-4 nonene and 3-(2-propyl)-3-dodecene with dinitrogen tetroxide and oxygen at temperatures between 3140° and 20°C. to form a nitroalkyl peroxynitrate. The intermediate nitroalky peroxynitrate is thereafter contacted with a reducing agent at a temperature of between 3120° and 30°C. to form a vicinal nitroalkyl nitrate in accordance with the procedure in U.S. Pat. No. 3,282,983. The vicinal nitroalkyl nitrate so prepared is subsequently converted to the dinitroalcohol by heating the nitrate at a temperature of at least 100°C. thereby thermally rearranging the vicinal nitroalkyl nitrate to a 3,5-dinitro-2-alkanol in accordance with the procedure described in U. S. Pat. No. 3,579,594.

More specifically, the process of this invention comprises contacting a 3,5-dinitro-2-alkanol as hereinabove defined with a basic catalyst thereby forming a 1,3-dinitroalkane and either a ketone or an aldehyde. Illustrative of the basic catalysts contemplated in the instant invention are oxides, hydroxides and salts of weak acids of the metals of Group IA, IB, IIA, IIB, IIIA, VIIB and VIII of the Periodic Table exemplified by sodium acetate, sodium carbonate, sodium bicarbonate, sodium borate, sodium citrate, sodium hydroxide, potassium hydroxide, potassium acetate, potassium stearate, lithium hydroxide, magnesium oxide, magnesium oxalate, calcium oxide, calcium carbonate, calcium octoate, strontium oxide, strontium acetate, barium oxide, barium hydroxide, barium carbonate, copper stearate, cupric oxide, zinc oxide, aluminum hydroxide, aluminum hydrate, aluminum acetate, manganese acetate, manganese carbonate, cobalt acetate, and cobalt hydroxide. Other basic catalysts include basic nitrogen compounds illustrated by ammonia, ammonium carbonate, amines, such as triethylamine and triethanolamine, quaternary ammonium hydroxides and salts such as benzyltrimethylammonium hydroxide and its acetate. Highly preferred catalysts are potassium hydroxide, sodium hydroxide and benzyltrimethylammonium hydroxide. When catalysts such as sodium hydroxide and potassium hydroxide are employed it is advantageous to continuously remove the by-product ketones or aldehydes thereby providing a means for controlling reaction rates while simultaneously deterring polymer formation and condensation reactions of the carbonyl compounds produced.

In accordance with the inventive process the dinitroalcohol is contacted with the basic catalyst in amounts of about 0.01 to 0.5, preferably 0.08 to 0.4, equivalents of catalyst per mole of dinitroalcohol. While the exact mechanism by which the reaction proceeds is not fully understood, it is believed that the catalyst functions to remove a proton from the alcohols hydroxyl group thereby initiating a cleavage reaction.

The reaction temperature employed may vary from about 0° to 150°C. and preferably from about 25° to 105°C. In highly preferred embodiments where $R^6$ is an alkyl group the reaction temperature is between 50° and 105°C. Temperatures above 105°C. are generally undesirable in that such conditions promote the formation of resins while temperatures below 0°C. excessively prolong reaction times. The reaction time is normally between 10 minutes and 24 hours although longer and shorter periods may be employed.

Solvents such as methanol, ethanol, dioxane, tetrahydrofuran, benezene, chlorobenzene, dimethylformamide, dimethylsulfoxide, isopropyl alcohol, 2-methoxyethanol, acetonitrile, and ethylene glycol dimethyl ether may be employed in the course of the reaction and it is beneficial to provide the solvent in amounts ranging from about 50 to 98 weight percent solvent based on the weight of dinitroalcohol. Preferably, there is employed a solvent boiling from about 55° to 150°C. Such as methanol, ethanol, tetrahydrofuran and dioxane.

Specific examples of 1,3-dinitroalkanes prepared according to the inventive process include 1,3-dinitropropane, 1,3-dinitro-2,2-dimethylpropane, 1,3-dinitrobutane, 1,3-dinitropentane, 1,3-dinitro-2-ethylbutane, 1,3-dinitro-2-methyl-2-propylpentane, 1,3-dinitrooctane, 1,3-dinitro-10-methyldodecane and 1,3-dinitroeicosane. In practice yields as high as 60 percent 1,3-dinitro alkanes have been recovered while yields of greater than 35 percent aldehyde or ketone are recoverable. In general, dinitroalkane yield ranges from 40 to 50 percent.

In practicing the instant method, the dinitroalcohol can be heated to the appropriate temperature in the presence of the basic catalyst under conditions wherein the solvent distills. Volatile aldehydes or ketones codistill with the solvent and such carbonyl compounds can be separated from the distillate by for example fractional distillation or extraction. Alternatively the carbonyl compound can be recovered from the reaction medium by distillation or by forming a derivative such as an oxime which can be separated by filtration.

The residue after removal of the carbonyl compound contains the basic catalyst and the dinitroalkane. Water can be added to the residue so as to dissolve the catalyst and the 1,3-dinitroalkane extracted therefrom by employing a solvent such as an ether as diethylether, a hydrocarbon, such as methylcyclopentane or a chlorinated hydrocarbon such as trichloromethane. The dinitroalkane is thereafter recovered by evaporating the solvent. The catalyst can be recovered from the aqueous portion by simply evaporating the water. Where the residue comprises catalyst and a low molecular weight dinitroalkane such as 1,3-dinitropropane, the latter may be separated by distillation leaving behind the catalyst.

Ketones and aldehydes prepared according to this invention include, for example, acetone, 2-butanone, 2-pentanone, 2-methyl-3-pentanone, 2-hexanone, 3-hexanone, acetaldehyde and propionaldehyde.

In order to more fully illustrate the nature of this invention and manner of practicing the same the following examples are presented.

EXAMPLE I

To a solution of 2.85 grams of 3,5-dinitro-2-methyl-2-pentanol in 225 milliliters of methanol there was added 1 millimeter of methanolic 40 percent benzyltrimethylammonium hydroxide. The solution was heated and methanol was slowly distilled off over a period of six hours. The distillate was delivered into a receiver beneath the surface of a solution of 2.0 grams of 2,4-dinitrophenylhydrazine in 10 milliliters of concentrated sulfuric acid and 15 milliliters of water. Orange crystals formed in the distillate, the crystals recovered, washed initially with methanol and thereafter with water. After drying, 0.61 gram of product having a melting point of 119° to 125°C. was recovered. To the filtrate there was added 250 millileters of water and additional crystalline product was recovered, washed and dried as above. After recrystallization from 95 percent ethanol this product was found to have a melting point of 123° to 125°C. and indentified as acetone 2,4-dinitrophenylhydrazone.

The residue from the distillation was evaporated under vacuum at 40°C. leaving a browm liquid. 100 milliliters of water was added and the mixture was extracted with 150 milliliters of ether. The aqueous portion is evaporated at about 80°C. to leave benzyltrimethylammonium hydroxide as a solid. The ether extract was washed with saturated sodium chloride and dried over anhydrous magnesium sulfate. After evaporation of the solvent the yellow-orange liquid product, 0.99 gram, was recovered and identified by analysis to be 1,3dinitropropane.

EXAMPLE II

To a solution of 2.5 grams of 3,5-dinitro-2,4,4-trimethyl-2-pentanol in 75 milliliters of methanol there was added 1 milliliter of a 40 percent methanolic solution of benzyltrimethylammonium hydroxide. The solvent distillate was delivered beneath the surface of a solution composed of 0.8 gram of 2,4-dinitrophenylhydrazone in 6 milliliters of water and 4 milliliters of concentrated sulfuric acid while the reaction vessel was heated for 1 ½10 hours to a temperature of 65°C. to distill off the solvent. The distillate contained 0.90 gram of orange crystals which after recrystallization was identified as acetone 2,4-dinitrophenylhydrazone.

The residue from the distillation was evaporated under vacuum at 35°C. and to the orange liquid remaining there was added 50 milliliters of water. The resultant mixture was extracted with ether and after drying 1.58 gram of orange liquid was recovered and identified by analysis to be crude 1,3-dinitro-2,2-dimethylpropane. The aqueous portion is evaporated at about 90°C. and the catalyst is recovered as a solid.

EXAMPLE III

To a solution of 10.0 grams of 4,6-dinitro-3-hexanol in 200 milliliters of 1,4-dioxane, there is added 1 milliliter of methanolic 40 percent benzyltrimethylammonium hydroxide. The solution is heated, and dioxane is slowly distilled off during a 4-hour period. Propionaldehyde also distills off, and is present as a solution in the distillate. The residue consists of 1,3-dinitropropane and benzyltrimethylammonium hydroxide. The latter is removed by washing the residue with water. Benzyltrimethylammonium hydroxide can be recovered from the aqueous washings if desired, by evaporation of most of the water, and 1,3-dinitropropane is recovered.

The distillate is fractionated by further distillation. Propionaldehyde distills first and is recovered. There remains 1,4-dioxane which can also be recovered.

EXAMPLE IV

To a solution of 10.0 grams of 3,5-dinitro-2-methyl-2-heptanol in 200 milliliters of ethylene glycol dimethyl ether, there is added 1 milliliter of 30 percent aqueous potassium hydroxide. The solution is heated, and the solvent is distilled from the mixture during a 4-hour period. Acetone is also concomitantly distilled. The residue, containing 1,3-dinitropentane, is diluted with water and extracted with ether. The aqueous portion is evaporated at about 100°C. and potassium hydroxide is recovered as a solid. The ether portion is dried using anhydrous magnesium sulfate and the ether is evaporated. There remains 1,3-dinitropentane.

The distillate is further distilled, and acetone is recovered leaving ethylene glycol dimethyl ether.

EXAMPLE V

To a solution of 10.0 grams of 4,6-dinitro-3,5,5-trimethyl-3-hexanol in 200 ml. of methanol, there is added 0.2 gram of sodium hydroxide. The solution is heated and the solvent is distilled from the mixture during a four hour period along with 2-butanone. The residue containing 1,3-dinitro-2,2-dimethylpropane and sodium hydroxide is diluted with water and the dinitroalkane extracted with ether. The aqueous portion is evaporated and sodium hydroxide is recovered as a solid. Evaporation of the ethereal solution leaves 1,3-dinitro-2,2-dimethyl-propane as an oil. 2-butanone is separated from the distillate by fractional distillation.

I claim:

1. A method of preparing 1,3-dinitroalkanes which comprises contacting a dinitroalcohol having at least five carbon atoms and corresponding to the formula:

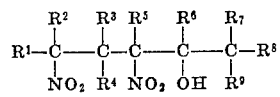

where $R^1$ is hydrogen or an alkyl group having from 1 to 50 carbon atoms and where $R^{2-9}$ are hydrogen or alkyl groups having from one to 10 carbon atoms with a basic catalyst selected from the group consisting of oxides, hydroxides and salts of weak acids of the metals of Groups IA, IB, IIA, IIB, IIIA, VIIB and VIII of the Periodic Table and basic nitrogen compounds at a temperature of from about 0° to 150°C.

2. A method according to claim 1 wherein said contacting is conducted at a temperature of from about 50° to 105°C.

3. A method according to claim 1 wherein from about 0.01 to 0.5 equivalent of said catalyst are employed per mole of said dinitroalcohol.

4. A method according to claim 1 wherein from about 0.08 to 0.4 equivalent of said catalyst is employed per mole of said dinitroalcohol.

5. A method according to claim 1 wherein said catalyst is benzyltrimethylammonium hydroxide.

6. A method according to claim 1 wherein said catalyst is potassium hydroxide.

7. A method according to claim 1 wherein said catalyst is sodium hydroxide.

8. A method according to claim 1 wherein said dinitroalkane is 1,3-dinitropropane.

9. A method according to claim 1 wherein said dinitroalkane is 1,3-dinitro-2,2-dimethylpropane.

10. A method according to claim 1 wherein said dinitroalkane is 1,3-dinitropentane.

* * * * *

PO-1050
(5/69)

UNITED STATES PATENT OFFICE
CERTIFICATE OF CORRECTION

Patent No. 3,760,012           Dated September 18, 1973

Inventor(s) John M. Larkin

It is certified that error appears in the above-identified patent and that said Letters Patent are hereby corrected as shown below:

Col. 2, line 48     "3140°" should read -- -40° --
Col. 2, line 50     "nitroalky" should read --nitroalkyl--
Col. 2, line 51     "3120°" should read -- -20° --.
Col. 3, line 31     "alcohols" should read --alcohol's--
Col. 3, line 37     "Temperatures above 105°C." should read
                       --Temperatures above 150°C.--
Col. 5, line 4      "1 1/210" should read --1 1/2--

Signed and sealed this 7th day of May 1974.

(SEAL)
Attest:

EDWARD M.FLETCHER,JR.            C. MARSHALL DANN
Attesting Officer                  Commissioner of Patents